Dec. 24, 1968    W. MESKAT    3,417,969
APPARATUS FOR FEEDING AND MIXING FREE-FLOWING MATERIALS
Filed Jan. 24, 1967    4 Sheets-Sheet 1

INVENTOR.
WALTER MESKAT.
BY Burgess, Dinklage & Sprung
ATTORNEYS

Dec. 24, 1968  W. MESKAT  3,417,969
APPARATUS FOR FEEDING AND MIXING FREE-FLOWING MATERIALS
Filed Jan. 24, 1967  4 Sheets-Sheet 3
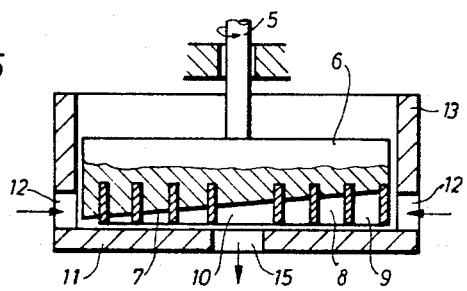
FIG. 5
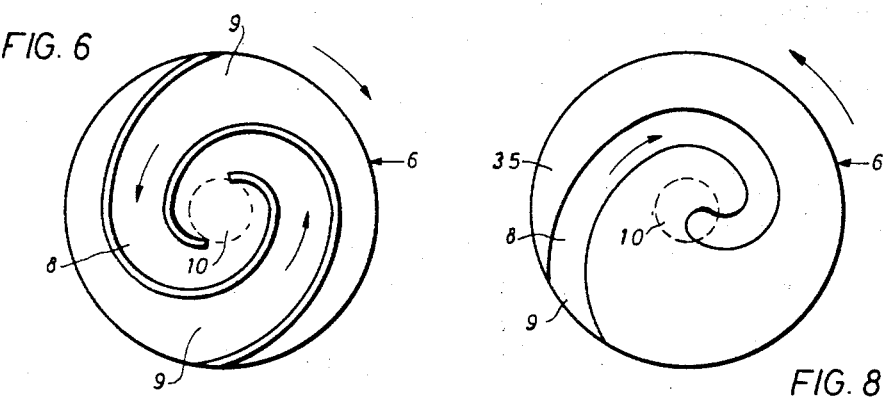
FIG. 6
FIG. 8
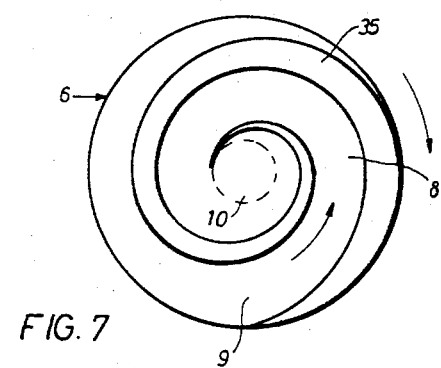
FIG. 7
INVENTOR.
WALTER MESKAT
BY
ATTORNEYS Dec. 24, 1968   W. MESKAT   3,417,969
APPARATUS FOR FEEDING AND MIXING FREE-FLOWING MATERIALS
Filed Jan. 24, 1967   4 Sheets-Sheet 4
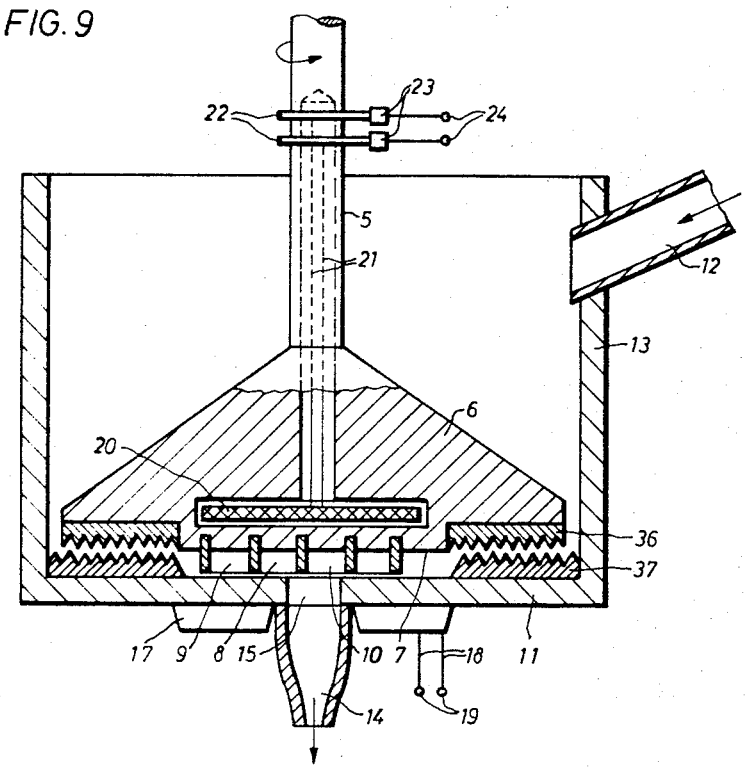
INVENTOR.
WALTER MESKAT
BY
ATTORNEYS

United States Patent Office 3,417,969
Patented Dec. 24, 1968

3,417,969
APPARATUS FOR FEEDING AND MIXING FREE-FLOWING MATERIALS
Walter Meskat, Leverkusen, Germany, assignor to Farbenfabriken Bayer Aktiengesellschaft, Leverkusen, Germany, a corporation of Germany
Filed Jan. 24, 1967, Ser. No. 611,452
Claims priority, application Germany, Feb. 3, 1966,
F 48,340
16 Claims. (Cl. 259—7)

ABSTRACT OF THE DISCLOSURE

A feeding apparatus comprising a housing; inlet means through the side walls of the housing; outlet means through the bottom of the housing; a rotatable body within the housing adapted to receive material from the inlet and force such through the exit; and motor means to impart rotation to the rotatable body. The rotatable body has at least one helix thereon, directed with the crown thereof toward the exit.

---

This invention relates to an apparatus for feeding, mixing, kneading, fusing and extruding free-flowing materials for example liquids, pastes or fine-grained materials. The apparatus comprises a rotating body provided with screw threads which is mounted for rotation in a housing filled with the stock or materials.

In known screw assemblies with threads formed helically around the axis of rotation of the screw, maximum throughput is limited by an optimum speed of rotation corresponding to the particular type of feedstock. If this optimum speed of rotation is exceeded, the absorption capacity of the screws undergoes a progressive decrease which in turn leads to a corresponding reduction in throughput. In addition, a considerable amount of heat is developed which detrimentally affects some materials.

It has now been found that, compared with the optimum rotational speed of the known arrangements corresponding to the particular type of feedstock, considerably higher throughput can be obtained if, in accordance with the invention, the rotating body is arranged near the bottom of a housing provided with at least one bottom outlet, and if it is provided on its surface nearest the bottom outlet with at least on helical screw thread with an inlet opening, located on the periphery of the screwthread and pointing in the direction of rotation of the rotating body and an outlet opening, located on the inner end of the helical thread, which is directed towards the bottom outlet of the housing. In this way, the absorption capacity of the screws is significantly increased, whilst the amount of heat developed remains within tolerable limits on account of the brief residence time of the feedstock in the screw thread. It is possible by means of an arrangement such as this successfully to feed, mix, fuse and extrude not only Newtonian liquids, i.e. liquids whose viscosity is not governed by the flow gradient, but also non-Newtonian liquids, particularly elasto-viscous liquids.

The surface provided with the helical screw thread will differ in its configuration, depending both upon the purpose, and upon the particular type of material for which the apparatus is to be used. For example the cross-section of the helical screw thread can be reduced towards its outlet opening and hence the feedstock can be subjected to an additional increase in pressure following its introduction into the apparatus. Normally the lower surface of the rotating body is flat although it is possible in accordance with the invention to make it conical or semi-conical, completely or partly concave or convex, or even inclined. An increase or drop in pressure can also be obtained by tapering or thickening the helical screwthread towards the centre. For some feedstocks, it is desirable to be possible to vary the width of the gap between the screw thread and the underneath of the housing. Accordingly, another feature of the invention is the provision of a vertical adjustment on the shaft of the rotating body. Providing the stock inlets inside the housing are substantially level with the helical screw thread, a seal can be provided between the rotating body and the housing above the screw thread. According to another embodiment of the invention, however, the stock can also be introduced into the housing above the rotating body in cases where it is intended to obtain a mixing effect in the space above the rotating body, for example when several components are introduced.

A variety of materials, for example granular plastics, can be fused in the apparatus because it is possible in accordance with the invention to equip both the rotating body and the housing with heating elements. Cooling means may also be provided in cases where the feedstock has to be cooled. It is of course possible according to a further development of the invention to use the apparatus as an extruder by providing the bottom outlet with an extruder nozzle. If plastics are introduced into such an extruder in the form of granules or chips, it has proved to be of advantage to provide the rotating body and the housing with co-operating size-reduction tools, for example grinding or crusher plates, to enable the material to be mechanically pre-comminuted. The shaft of the rotating body may also be mounted in such a way that the body rotates with a tumbling motion.

Embodiments of the invention are diagrammatically illustrated in the accompanying drawings, wherein:

FIGS. 2, 3, 4 and 5 are sections through various embodiments of the underside of the rotating body provided with the screw thread.

FIGS. 6, 7, and 8 are each plan views of different embodiment of the helical screw thread.

FIG. 9 is a section through an apparatus provided with crushing tools.

Figure 1:
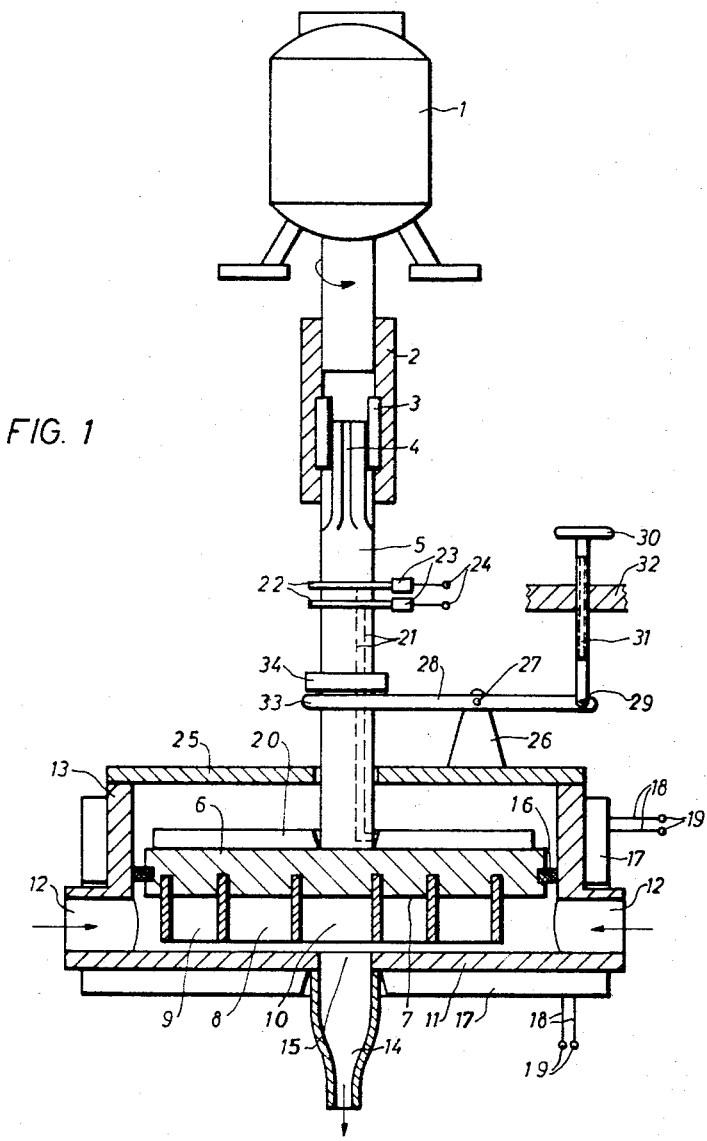
FIG. 1 is a vertical section through one embodiment of the apparatus according to the invention.

In the embodiment shown in FIG 1, a motor 1 drives a shaft 5 through a clutch 2 provided with keyways 3. The shaft 5 is also provided with keyways 4 at its upper end and, at its lower end, carries a rotating body 6 whose underside 7 is provided with a helical screw thread 8. The inlet opening 9 of this screw thread is located tangentially on the periphery of the rotating body 6 whilst the downwardly directed outlet opening 10 lies at the centre of the helix. Formed centrally in the bottom panel 11 of the housing 13 provided with inlets 12 is the bottom outlet 15 terminating in an extruder nozzle 14. The rotating body 6 is sealed off from the housing 13 by means of a seal 16. Arranged around the housing 13 on the underside of its bottom panel 11 are electrical heating elements 17 whose connections 18 lead to the terminals 19. The rotating body 6 is also provided with electrical heating elements 20 whose connections 21 lead through a drill hole in the shaft 5 to the collector rings 22. Carbon brushes 23 are connected to the terminals 24. Arranged on the cover 25 of the housing is a support 26 comprising a fulcrum pin 27 for the lever 28. One end of the lever 28 is connected through a link 29 with a spindle 31 which is adjustably held in the nut 32, being provided with a handwheel 30. At its other end, the lever 28 terminates in a fork 33 resting against a ring 34 mounted on the shaft 5.

Figure 2:
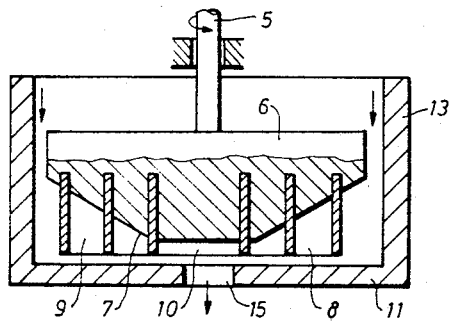

According to FIG. 2, the underside 7 of the rotating body 6 is in the form of a truncated cone.

Figure 3:
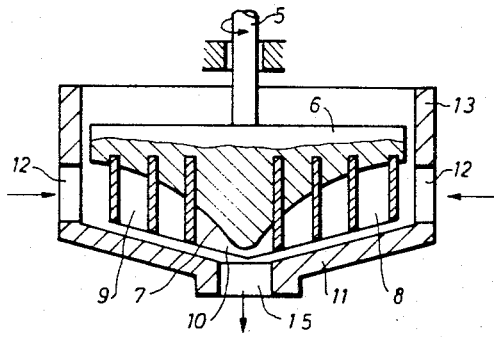

According to FIG. 3, the underside 7 of the rotating body 6 is again substantially conical. In this case, however, the sides of the cone are concave, and its tip truncated.

Figure 4:
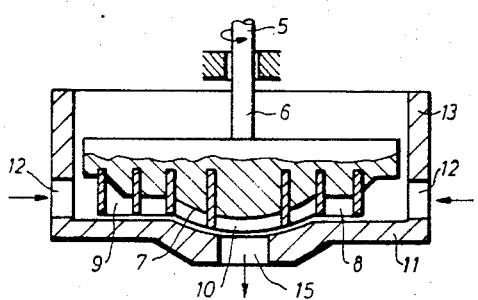

According to FIG. 4, the configuration of the underside 7 is such that the gap between such underside 7 and the housing 11 becomes smaller along the helical thread 8 towards the outlet 10.

In FIG. 5, the underside 7 of the rotating body 6 is inclined relative to the horizontal.

FIG. 6 is a plan view of a rotating body 6 with two helical threads 8. The inlets 9 are peripherally located, whilst the common outlet 10 is centrally arranged.

According to FIG. 7, the thickness of the wall 35 of the screw thread 8 decreases towards the outlet. On the other hand, in FIG. 8, the thickness of the wall 35 of the screw thread 8 increases towards the outlet.

According to FIG. 9, the shaft 5 is connected to the rotating body 6 which, in addition to a helical screw thread 8, also provided with crushing plates 36 co-operating with the crushing plates 37 of the housing 13 which is provided with a feedstock inlet 12 and a bottom outlet 15. The heating elements 17 arranged on the bottom of the housing 13 are connected by leads 18 to terminals 19. The rotating body 6 is provided with a heating element 20 whose connections 21 lead through a drill hole in the shaft 5 to the collector rings 22. Carbon brushes 23 are connected to the terminals 24.

The arrangement shown in FIG. 1 functions as follows: A liquid or pasty material is introduced, optionally under pressure, into the housing 13 through the feedstock inlets 12. The feedstock inlets 12 may be arranged radially or tangentially, or in any intermediate position. The inlet opening 9 of the screw thread 8 provided on the underside 7 of the rotating body 6 in the direction of rotation, and takes up the feedstock introduced and, forces it through the channel 8 as a result of which it is accelerated and subjected to an increasing pressure. The feedstock then flows through the outlet 10 of the screw thread 8 into the bottom outlet 15 of the housing 13. Finally, the feedstock leaves the apparatus through the extruder nozzle 14. For example, the stock introduced can be fused and kept fluent by means of electrical heating elements 17 and 20. The apparatus can of course alternatively be heated with steam, hot water or hot air. It may be desirable to cool some types of feedstock, for example if it is intended that it should leave the apparatus with a specified viscosity. For this purpose, the heating system can be replaced by a cooling system.

The helical screw thread 8 and the underside 7 of the rotating body 6 will be individually designed, depending upon the properties of the feedstock and the particular function assigned to the apparatus for working the feedstock. A reduction in the gap between the screw 8 and the housing 11 can be provided by suitably designing the underside 7 of the rotating body 6, thus producing an increasing pressure in the feedstock, accompanied by an increase in its rate of flow. A similar effect is obtained if the wall 35 of the screw thread 8 is increased in thickness towards the outlet 10. By contrast, the width of the thread 8 can be enlarged by tapering the wall 35 in such a way that no additional pressure is exerted on the feedstock, so that it is not accelerated. The choice between one or other form of the screw thread 8 will also depend upon the properties of the feedstock to be delivered.

All these measures are also of importance where it is intended to introduce several feedstock components into the apparatus and subject them to one mixing cycle, because any change in the cross-section of the screw thread 8 has a marked effect on the type of superimposed directions of movement of the stock in the thread, whilst a certain desired mixing motion (secondary flow) can be obtained quite easily. It is also possible to influence feedstock flow within the apparatus by varying the width of the gap between the thread 8 and the bottom panel 11 of the housing 13.

Naturally, the applications discussed in the foregoing are only examples. Application of the invention to these particular fields may itself vary within wide limits.

I claim:
1. An apparatus for delivering and mixing, kneading, fusing and extruding free-flowing materials, which comprises a rotating body provided with at least one screw thread rotatable in a housing filled with the material, said rotating body being arranged near the bottom of said housing provided with at least one bottom outlet, and being provided on the surface nearest the bottom outlet with at least one helical screw thread whose inlet opening is located around the periphery of the thread and points in the direction of rotation of said rotating body, whose outlet opening, located at the inner end of said thread, is directed towards said bottom outlet of said housing, and whose crown is directed towards said outlet.

2. An apparatus as claimed in claim 1, wherein said surface of said rotating body which is provided with the helical screw-thread, is flat.

3. An apparatus as claimed in claim 2, wherein said housing is provided with heating or cooling elements.

4. An apparatus as claimed in claim 2, wherein said rotating body is provided with temperature controlling elements.

5. An apparatus as claimed in claim 2, wherein an extruder nozzle is arranged around said bottom outlet of said housing.

6. An apparatus as claimed in claim 2, wherein said rotating body and said housing are both provided with crushing tools.

7. An apparatus as claimed in claim 1, wherein said surface of said rotating body is substantially conical.

8. An apparatus as claimed in claim 1, wherein said surface of said rotating body is substantially concave.

9. An apparatus as claimed in claim 1, wherein said surface of said rotating body is substantially convex.

10. An apparatus as claimed in claim 1, wherein the surface of said rotating body is inclined to the horizontal.

11. An apparatus for delivering and mixing, kneading, fusing and extruding free-flowing materials, which comprises a rotating body provided with at least one screw thread rotatable in a housing filled with the material, said rotating body being arranged near the bottom of said housing provided with at least one bottom outlet, and being provided on the surface nearest the bottom outlet with at least one helical screw thread whose inlet opening is located around the periphery of the thread and points in the direction of rotation of said rotating body, whose outlet opening, located at the inner end of said thread, is directed towards said bottom outlet of said housing, and whose crown is directed towards said outlet, and wherein the surface of said rotating body nearest the outlet is substantially conical, and wherein said helical screw tapers towards said outlet opening.

12. An apparatus as claimed in claim 11, wherein said screw-thread increases in thickness towards said outlet opening.

13. An apparatus as claimed in claim 11, wherein a vertical adjustment is provided on the shaft around which said rotating body rotates.

14. An apparatus as claimed in claim 11, wherein a seal is provided between said rotating body and said housing above said screw thread.

15. An apparatus as claimed in claim 11, wherein the material inlet opening in said housing is arranged above said helical screw thread.

16. An apparatus as claimed in claim 11, wherein said material inlet opening in said housing is level with said helical screw thread.

References Cited

UNITED STATES PATENTS

| | | | | |
|---|---|---|---|---|
| 863,250 | 8/1907 | Abbe | | 103—95 |
| 2,573,440 | 10/1951 | Hennig | | 259—7 |
| 2,857,144 | 10/1958 | Gurley | | 259—7 |
| 2,995,346 | 8/1961 | Samples | | 259—8 |

ROBERT W. JENKINS, *Primary Examiner.*

U.S. Cl. X.R.

259—43